United States Patent [19]

Chung

[11] Patent Number: 4,495,119

[45] Date of Patent: Jan. 22, 1985

[54] METHOD FOR PRODUCING HOMOGENEOUS BATTS OF AIR-LAID FIBERS

[76] Inventor: Raymond Chung, 208 Alcott Dr., Neenah, Wis. 54956

[21] Appl. No.: 397,376

[22] Filed: Jul. 12, 1982

[51] Int. Cl.$^3$ .............................................. B29N 19/00

[52] U.S. Cl. ...................................... 264/37; 264/518; 264/121

[58] Field of Search .......................... 264/518, 121, 37

[56] References Cited

U.S. PATENT DOCUMENTS

| | | | |
|---|---|---|---|
| 2,822,024 | 2/1958 | Himmelheber et al. | 264/37 |
| 3,792,943 | 2/1974 | Helgesson | 264/518 |
| 3,982,302 | 9/1976 | Vaalburg | 264/518 |
| 4,081,501 | 3/1978 | Muther | 264/518 |
| 4,115,490 | 9/1978 | Munk | 264/121 |

*Primary Examiner*—James R. Hall

[57] ABSTRACT

A method for making an air-laid batt of fibers which utilizes a plurality of scarfing rolls to remove material from the surface of the batt, wherein the batt is re-formed between at least two of the scarfing rolls in order to produce a more homogeneous web.

13 Claims, 5 Drawing Figures

METHOD FOR PRODUCING HOMOGENEOUS BATTS OF AIR-LAID FIBERS

BACKGROUND OF THE INVENTION

The use of scarfing rolls or their equivalents to meter fibers is commonly known industrial practice. For example, U.S. Pat. No. 2,635,301 teaches a mat forming device for wood fibers wherein a rotor having a plurality of tines is used to determine the thickness of the mat. U.S. Pat. No. 2,919,475 teaches a similar function for a process using various forms of wood materials for making fiberboard, wherein a spiked leveling roll is used to obtain a precise thickness. The materials scraped off are conveyed back to the feed hopper for recycle. U.S. Pat. No. 3,016,582 teaches a batt forming apparatus which uses a leveling rotor having four equally spaced vanes rather than individual tines or spikes. U.S. Pat. No. 4,091,161 teaches a dry-forming process for nonwoven webs wherein a rotating peak removal device consisting of a double comb rotating in the direction of the web removes excess material and directs it to recycle. U.S. Pat. No. 4,218,414 teaches an air-laying process wherein a peg roller is used to control the thickness of the batt. The excess fibers removed by the roller are thrown back and mixed with feed fibers.

Although all of these devices may work well for the specific processes in which they are used, it is believed such devices would not perform well in practice when used alone for the formation of uniform basis weight air-laid batts of wood fibers suitable as a feed for making light basis weight products such as facial tissue. For such processes, the basis weight of the batt must be extremely uniform to avoid quality defects in the final product. Without such uniformity it would be necessary to produce a heavier-than-necessary product to ensure that the thinnest spots in the batt are of adequate thickness to provide sufficient strength. Such over-designed products carry an economic penalty because of the unnecessarily high basis weight. Because the nature of such products requires high speed production at low cost, it is necessary that any metering devices used be effective, reliable, and inexpensive to operate.

SUMMARY OF THE INVENTION

In one aspect, the invention resides in a method for producing a batt of air-laid fibers comprising (a) depositing an excess of fibers on the upper surface of a moving foraminous fabric to form a batt; (b) compacting the batt against the fabric by maintaining a pressure differential through the batt and fabric which is constant with time and uniform in the cross-machine direction; (c) skimming an upper layer of fibers from the batt with a first scarfing roll, wherein the skimmed fibers are deposited on the moving fabric upstream of said first scarfing roll; and (d) reforming and skimming the reformed batt with a scarfing roll at least once, wherein the skimmed fibers removed by each successive scarfing roll are recycled and deposited upstream of said first scarfing roll. The resulting batt is preferably compressed in order to aid in handling and transporting the batt to the web former. For purposes herein, when referring tq the pressure differential "through the batt and fabric"; the pressure differential in question shall be the difference between the pressure of the airspace immediately above the batt and the pressure of the airspace immediately below the fabric.

Preferably, the invention resides in the abovesaid method comprising (a) depositing an excess of fibers on the upper surface of a moving foraminous fabric to form a batt; (b) compacting the batt against the fabric by maintaining a vacuum on the underside of the fabric which is constant with time and uniform in the cross-machine direction; (c) skimming an upper layer of fibers from the batt with a first scarfing roll, wherein the skimmed fibers are dispersed and deposited on the moving fabric upstream of said first scarfing roll; (d) reforming the batt by interrupting the vacuum through the fabric after it passes under the first scarfing roll; (e) skimming an upper layer of fibers from the reformed batt with a second scarfing roll positioned closer to the moving fabric than said first scarfing roll, wherein the skimmed fibers are recycled and deposited on the moving fabric upstream of said first scarfing roll; and (f) compressing the batt between at least one pair of press rolls.

In a further aspect, the invention resides in an apparatus for forming a uniform batt of air-laid fibers comprising: (a) an endless foraminous fabric for receiving and carrying a batt of air-laid fibers; (b) drive means for moving said fabric in the machine direction; (c) a plurality of scarfing rolls positioned above the fabric to remove an upper layer of fibers from the batt, each of said successive scarfing rolls preferably positioned closer to the fabric than the preceding roll; (d) means for creating and maintaining a vacuum on the underside of the fabric; (e) means for disrupting the vacuum along lengths of the fabric between at least one pair of scarfing rolls; (f) means for recycling all fibers skimmed from the batt by the scarfing rolls; and (g) at least one pair of press rolls located downstream of the scarfing rolls, wherein the batt and the fabric pass through the nip formed by the press rolls.

DETAILED DESCRIPTION OF THE DRAWING

Figure 1:
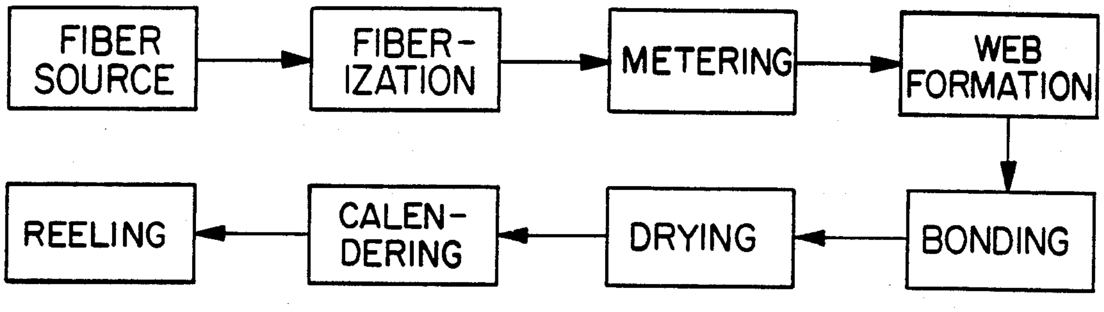
FIG. 1 is a block diagram of the overall dry forming or air forming process, illustrating the place of the metering function (batt formation) of this invention.

Directing attention to FIG. 1, the invention will be described in greater detail. This figure illustrates where the method of this invention fits into an overall dry forming (air forming) process. Fibrous material from one of several sources is fed to a fiberizer which provides a source of individual fibers for the metering process of this invention. The fiber source can be in the form of pulp sheets (shingles) or roll pulp, wherein the pulp is fed directly to the fiberizer. Alternatively, the fiber source can be in the form of pulp bales, usually secondary fibers, which must first be shredded prior to fiberization. Whatever the fiber source, a supply of individual fibers is produced by the fiberizer, which can consist of a hammermill type arrangement wherein multifiber particles are buffeted by rotating blades and forced through a screen to filter out all but the individual fibers. Such apparatus is known in the air forming art.

After the fibers have been individualized, they are fed to the metering function of this invention, which serves to provide a precisely controlled batt of fibers to feed a web former, which thereafter disperses the batt fibers and lays a thin layer of the fibers on a moving fabric. An example of such a former is illustrated in U.S. Ser. No. 268,174 filed May 29, 1981 which is hereby incorporated by reference. It is necessary that the basis weight of the batt fed to the web forming section be precisely controlled because the basis weight of the final product reflects the uniformity of the feed, even though the feed batt is dispersed in the web former.

After the web is laid, it is bonded with pressure or adhesive to stabilize its structure and dried. In the case of facial tissue manufacture, the dried web is calendered to smooth out the surfaces and thereafter wound up on a reel spool for converting. It will be appreciated that all of these functions are, generally speaking, well known to those skilled in the art of dry forming.

Figure 2:
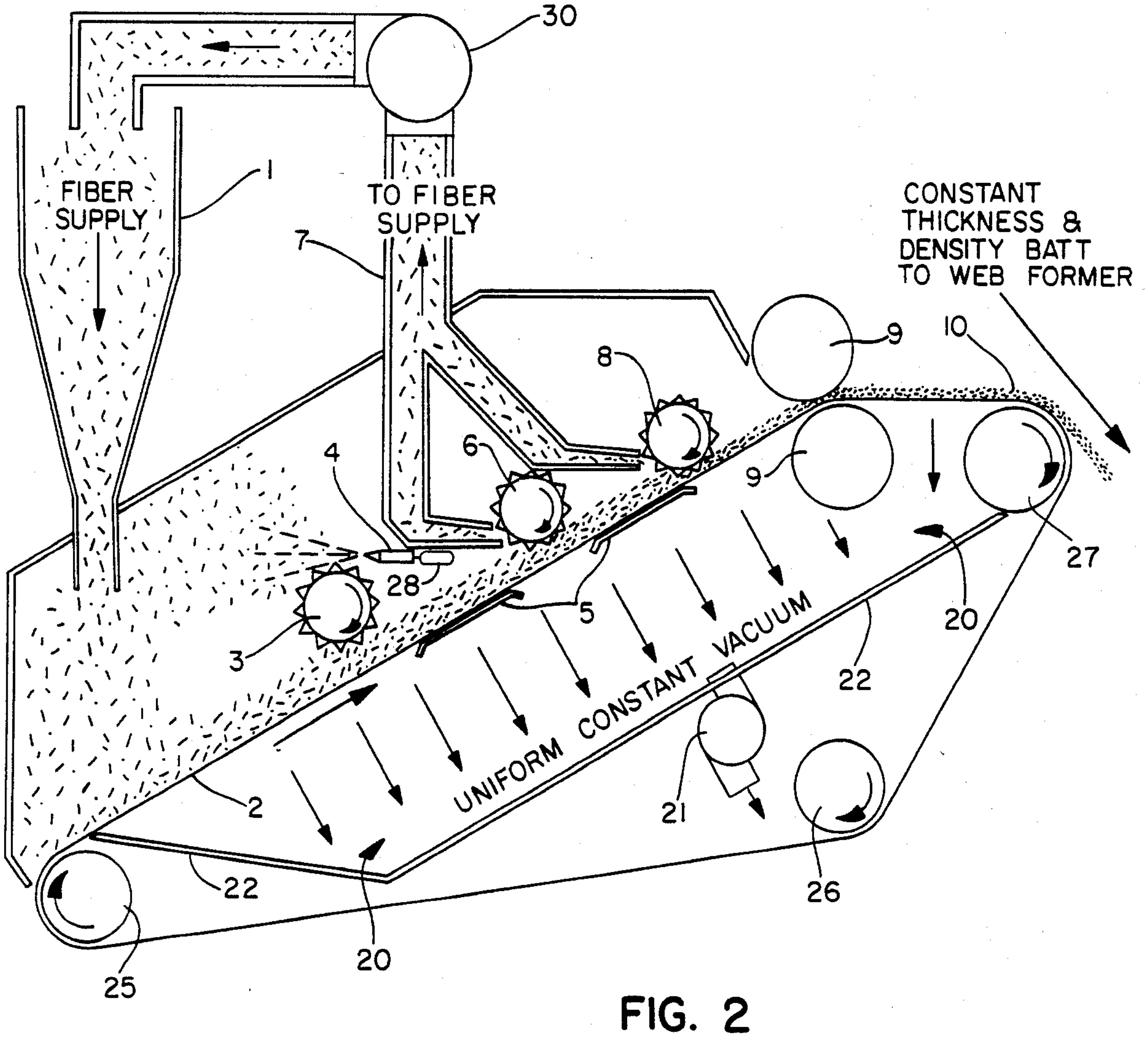
FIG. 2 is a schematic diagram of an apparatus for carrying out a method of this invention, illustrating a preferred embodiment having three scarfing rolls and blocking plates for interrupting the vacuum to reform the batt.

FIG. 2 is a schematic illustration of a preferred metering apparatus (scarfing meter) for carrying out the method of this invention, showing the formation of the batt of fibers to be fed to the web former. Individual fibers are introduced to the scarfing meter from a suitable supply source 1 such as a cyclone or drum separator. The fibers are deposited on a moving foraminous fabric 2 of the type commonly used in the paper industry driven and supported by rolls 25, 26, and 27. The fabric can operate at any speed, but suitable fabric speeds fall in the range of from about 10 to about 1000 feet per minute, with a preferred range of from about 50 to about 100 feet per minute. Fabrics having a mesh size of about 78×64 have been used with satisfactory results. Since the fabric must support the batt while at the same time prevent undue fiber loss through the fabric openings, any mesh size accomplishing these requirements can be used. The fibers are supplied in amounts sufficient to insure that scarfing (skimming off a layer of fibers) of the batt occurs along the full width of the first scarfing roll 3, which rotates such that the surface of the roll at the point of contact with the batt is travelling counter to the direction of the moving batt as shown. For purposes herein, this condition will be simply referred to as an "excess" of fibers. Having an excess of fibers prevents formation of depressions in the batt which indicate areas of insufficient basis weight. Factors which bear on achieving an excess of fibers include the speed of the moving fabric 2, the fiber feed rate, the pressure differential across the fabric, and the distance between the first scarfing roll and the fabric. A constant and uniform pressure differential is maintained through the batt and fabric to compact the batt against the fabric. This is most easily accomplished by maintaining a vacuum on the underside of the fabric (the side of the fabric not in contact with the batt) as indicated. It is important that the resulting pressure differential be constant with time and uniform at least in the cross machine direction in order to obtain an even degree of compaction and hence uniform basis weight. The area of the batt where a constant and uniform pressure differential is most critical is that area directly underneath the scarfing rolls. A uniform vacuum on the underside of the fabric can be achieved by forming a large vacuum chamber 20 with a vacuum barrier 22 and a vacuum pump 21. Generally, a vacuum of from about 2 to about 10 inches water is advantageous and a vacuum of from about 3 to about 6 inches water is preferred for wood fibers. It is also preferred to have the vacuum relatively uniform in the machine direction as well as the cross machine direction simply for convenience in operation. This mode of operation is illustrated in both FIGS. 2 and 3. Nevertheless, different pressure differentials can be maintained at different points along the machine direction if desirable, particularly at the points under different scarfing rolls. However, regardless of the pressure differential differences in the machine direction, the pressure differentials must be constant with time and also uniform in the cross-machine direction to mitigate against inconsistencies in the final batt.

Figure 4:
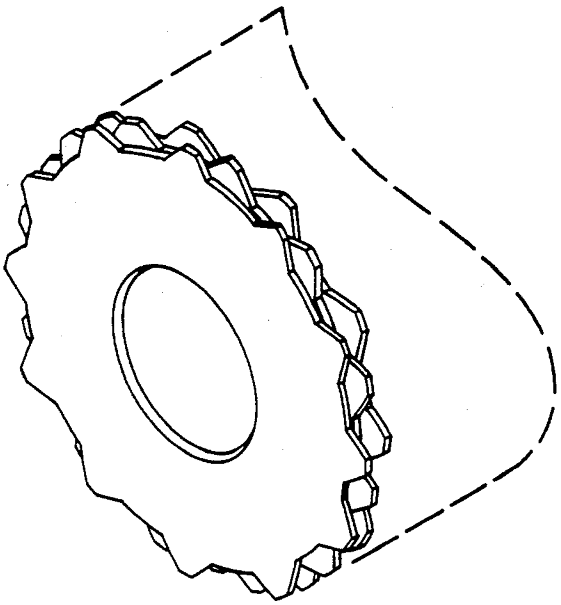
FIG. 4 is a partial perspective of one scarfing roll having a design suitable for use in this invention.
Figure 5:
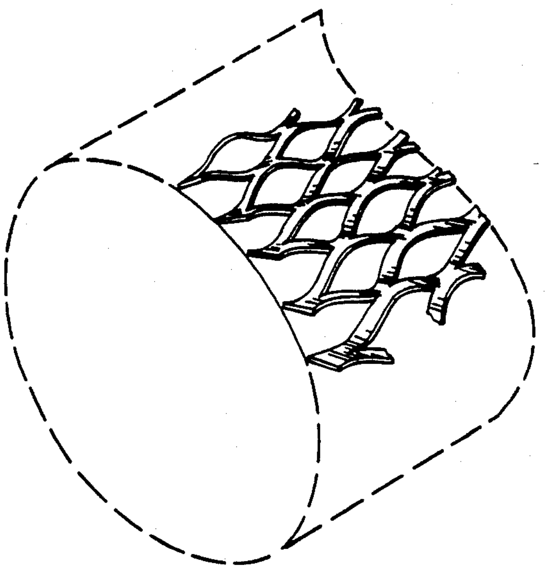
FIG. 5 is another partial perspective of a scarfing roll having an alternative design which is also suitable for use in this invention.

As the excess of fibers is conveyed by the moving fabric 2, an upper layer of the fibers is skimmed off by the first scarfing roll 3 to form a relatively even batt. The scarfing roll 3 contains protrusions which engage the top layer of fibers and redeposit them on the moving fabric upstream of the first scarfing roll as shown. The precise size and configuration of the protrusions can vary widely, but the scarfing roll is preferably of a design sufficient to prevent fibers from passing through the protrusions to cause streaking of the batt. Suitable alternative designs are shown in FIGS. 4 and 5. The first scarfing roll preferably operates at a surface speed of about 150 to about 200 feet per second. This speed can vary, but must be high enough to remove the top layer of fibers without pulling the remainder of the batt with it. The distance between the first scarfing roll and the fabric, in one embodiment, is about 1.25 inch. This distance will be dictated by the basis weight of the desired product and the extent of the compaction of the batt as effected by the pressure differential. The fibers skimmed by the first scarfing roll are preferably dispersed by some means which prevents them from concentrating in a particular area relative to the cross machine direction. This can easily be accomplished by an air jet(s) 4 suitably connected to a source of compressed air 28 directed over the top of the first scarfing roll, which serves to blow and disperse the skimmed fibers as shown.

After the batt passes the first scarfing roll, it is necessary that it be reformed by rearranging or relaxing the fibers. The purpose of reforming is to achieve a homogeneous batt structure by momentarily restructuring the batt. Reforming can be suitably accomplished by relaxing the vacuum or otherwise reducing the pressure differential through the batt and fabric for part of the distance in the machine direction between the first scarfing roll and the second scarfing roll. This can be accomplished by directing an air jet (See FIG. 3) upwardly through the fabric to disrupt the batt structure with a gentle stream of air. Preferably, however, reforming can simply be accomplished by blocking off the vacuum beneath the fabric, as accomplished with blocking plates 5 of FIG. 2, which presses against the underside of the fabric between the first and second scarfing rolls. Reforming is occasioned by some expansion of the batt and allows the presence of some non-uniformly compacted areas within the batt to manifest themselves, creating an uneven surface to be removed by the subsequent scarfing roll.

The reformed batt is then subjected to the action of at least one additional scarfing roll such as shown. The second scarfing roll 6 is preferably positioned closer to the fabric than the first scarfing roll. (Whether or not the second or subsequent scarfing rolls are closer to the fabric than the first scarfing roll will depend on the pressure differential across the fabric at that location. It is possible that the second or subsequent scarfing rolls can be higher than the first or previous scarfing roll if the pressure differential is sufficiently decreased. However, it is preferred that each successive scarfing roll be positioned slightly closer to the fabric than the previous one to assure removal of fibers along the entire width of the batt, since controlling the pressure differential under each scarfing roll individually is unnecessarily complicating.) The second scarfing roll skims a top layer of fibers off the reformed batt and directs them into a recycle means 7, which prevents the skimmed fibers from being deposited and building up on the reformed web. The fibers are instead recycled with the aid of a fan pump 30 and deposited upstream of the first scarfing roll as indicated where the batt thickness is controlled by the feed rate.

After the second scarfing roll, the resulting batt is preferably reformed again and subjected to a third scarfing roll 8. Again the skimmed fibers are recycled and deposited upstream of the first scarfing roll. This process of reforming and skimming can be repeated as many times as is necessary to achieve the desired homogeneity.

The resulting batt is optionally compressed by at least one pair of press rolls 9 in order to debulk the batt to give it sufficient structural integrity to be transported to the web former. This is accomplished by passing the batt, supported by the fabric, through the nip formed by the press rolls. At this point the compressed batt 10 has a constant thickness and density (constant basis weight). The thickness can be any value depending upon the desired product. As an example, it can be generally about $\frac{3}{4}$–$\frac{1}{2}$ inch. The basis weight can be generally about 400 pounds per 3000 square feet for facial tissue applications and somewhat more for other applications such as diapers or feminine pads.

Figure 3:
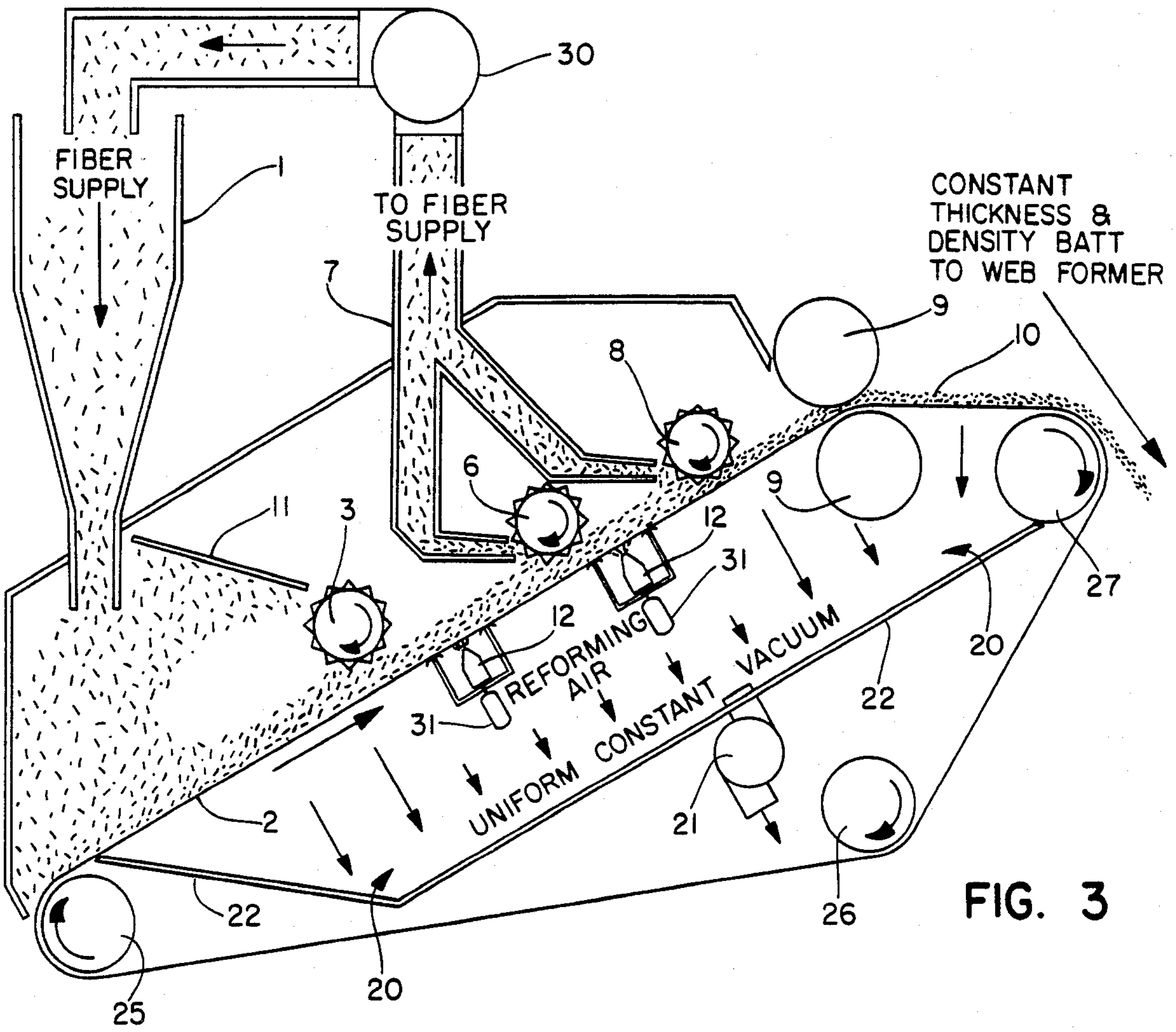
FIG. 3 is a schematic of alternative apparatus for carrying out this invention, specifically illustrating the use of forced air to reform the batt.

FIG. 3 illustrates some slight variation of the embodiment illustrated in FIG. 2. Specifically, FIG. 3 shows the first scarfing roll 3 depositing the skimmed fibers upstream of the first scarfing roll without the aid of an air jet or other source of compressed gas. Instead, the fibers are contained by an optional barrier 11 and are dispersed by the action of the scarfing roll.

In addition, reforming of the skimmed batts is shown to be accomplished by the use of forced gas (air) from an air knife or air jets 12 suitably connected to a source of compressed air 31. Although this method for reforming can provide a greater degree of fiber reorientation than the blocking plates, it is also much more difficult to control because of the width of the batt. Constant and equal flow rates cross deckle can be hard to achieve and requires constant pressure headers and/or properly designed orifice sizes and locations. For this reason the blocking plates are preferred.

FIG. 4 illustrates a scarfing roll design suitable for purposes of the invention in which the scarfing roll is constructed by stacking a series of generally circular metal plates having a series of generally triangular protrusions spaced around the periphery. The plates are assembled such that the protrusions are arranged in a random pattern. The triangular protrusions are approximately equilateral and extend outwardly about $\frac{1}{4}$ to about $\frac{3}{8}$ inch from the surface of the roll. Each plate making up the roll is about 1/16 inch thick.

FIG. 5 illustrates an alternative scarfing roll design which is also suitable for purposes of this invention. This roll is constructed by wrapping a sheet of expanded metal around a roll to provide an irregular surface. The expanded metal is produced by stretching a metal sheet having a series of crosswise slits to form the pattern illustrated in FIG. 5.

Any number of different scarfing roll designs can be used satisfactorily in carrying out the method of this invention, which is not limited to either of the designs disclosed herein for purposes of illustration.

As indicated previously it is within the scope of this invention to include two or more scarfing rolls operating in conjunction with at least one reforming step. Not all of the scarfing rolls must be positioned closer to the fabric than the first one, since reforming provides a means of removing additional fibers from the batt to achieve uniformity. But it is preferable that at least one subsequent scarfing roll be positioned closer to the fabric than the first roll to ensure adequate scarfing to achieve a uniform basis weight.

It will be appreciated that the foregoing examples, shown for purposes of illustration, are not to be construed as limiting the scope of this invention as defined by the following claims.

I claim:

1. A method of producing a batt of air-laid fibers comprising:
(a) depositing an excess of feed fibers on a moving foraminous fabric to form a batt having a machine direction and a cross-machine direction;
(b) compacting the batt against the fabric by maintaining an air pressure differential through the batt and the fabric which is constant with time and uniform in the cross-machine direction;
(c) skimming an upper layer of fibers from the batt with a first scarfing roll, wherein the skimmed fibers are deposited on the moving fabric upstream of said first scarfing roll;
(d) reforming the batt by rearranging the fibers within the batt; and
(e) skimming an upper layer of the fibers from the reformed batt with a second scarfing roll wherein the skimmed fibers are recycled and deposited upstream of the first scarfing roll and wherein a batt of relatively uniform basis weight is produced.

2. The method of claim 1 wherein the air pressure differential across the fabric is produced by maintaining a vacuum of the side of the fabric not in contact with the batt.

3. The method of claim 2 wherein the pressure differential is relatively uniform in the machine direction.

4. The method of claim 2 wherein reforming of the batt is accomplished by reducing the air pressure differential through the batt and fabric.

5. The method of claim 4 wherein the air pressure differential is reduced by the presence of a blocking plate pressing against the side of the fabric not in contact with the batt and positioned between at least one pair of successive scarfing rolls.

6. The method of claim 2 wherein reforming of the batt is accomplished by a stream of air directed through the fabric causing the fibers in the batt to realign themselves.

7. The method of claim 1 wherein the fibers skimmed off the batt by the first scarfing roll are dispersed before being redeposited on the fabric upstream of said first scarfing roll.

8. The method of claim 7 wherein the fibers are dispersed by forced air.

9. The method of claim 1 wherein each successive scarfing roll is closer to the fabric than the previous scarfing roll.

10. The method of claim 1 wherein the batt resulting from step (e) is reformed and scarfed at least one additional time.

11. A method of producing a uniform batt of air-laid fibers comprising:

(a) depositing an excess of feed fibers on a moving foraminous fabric to form a batt;

(b) compacting the batt against the fabric by maintaining a vacuum on the underside of the fabric which is constant with time and uniform in the cross-machine direction;

(c) skimming off an upper layer of fibers from the batt with a first scarfing roll, wherein the skimmed fibers are dispersed and deposited on the moving fabric upstream of said first scarfing roll;

(d) reforming the batt by interupting the vacuum with a blocking plate in contact with the underside of the fabric and positioned between the first scarfing roll and a second scarfing roll; and (e) skimming an upper layer of fibers from the reformed batt with said second scarfing roll positioned closer to the fabric than the first scarfing roll, wherein the skimmed fibers are recycled and deposited upstream of the first scarfing roll.

12. The method of claim 11 wherein the batt resulting from step (e) is reformed and skimmed with a third scarfing roll positioned closer to the fabric than the second scarfing roll, wherein the skimmed fibers are recycled and deposited upstream of the first scarfing roll.

13. The method of claim 12 wherein the batt formed by the third scarfing roll is compressed between a pair of press rolls.

* * * * *